United States Patent [19]

Nichols

[11] Patent Number: 5,396,794
[45] Date of Patent: Mar. 14, 1995

[54] ENGINE CATALYST AGING SYSTEM AND METHOD FOR AGING CATALYST

[75] Inventor: Angelo H. Nichols, Grosse Pointe Woods, Mich.

[73] Assignee: Applied Computer Engineering, Inc., Warren, Mich.

[21] Appl. No.: 43,034

[22] Filed: Apr. 5, 1993

[51] Int. Cl.6 .......................................... G01M 15/00
[52] U.S. Cl. ................................................. 73/118.1
[58] Field of Search ........................... 73/118.1, 865.6; 60/277

[56] References Cited

U.S. PATENT DOCUMENTS

| | | | |
|---|---|---|---|
| 4,116,173 | 9/1978 | McDougal et al. | 123/117 R |
| 4,567,756 | 2/1986 | Colborn | 73/118.1 |
| 4,878,380 | 11/1989 | Goodman | 73/118.1 |
| 4,945,760 | 8/1990 | Hornung | 73/118.1 |
| 5,077,970 | 1/1992 | Hamburg | 60/274 |
| 5,119,628 | 1/1992 | Uema et al. | 60/274 |
| 5,129,228 | 7/1992 | Kondo | 60/274 |

Primary Examiner—Robert Raevis

[57] ABSTRACT

The present invention provides a method for catalytic aging and a system for catalytic aging. The system modifies the operation of the engine while running in combination with a catalyst, making the engine a programmable gas generator for the catalyst. The present invention allows an operator to alter the operation of the engine by varying the signals to the engine's injectors, thereby altering the exhaust gas of the engine. While the engine is operating under user initiated injector signals, a simulated exhaust gas oxygen signal is provided to the engine control module. This signal results in maintaining the engine in stable operation while operating in an unstable state. In a preferred embodiment additional gases are injected into the exhaust gas being supplied to the catalyst. The system periodically returns all functions to the engine control modules allowing the establishment of new operating parameters for the engine.

13 Claims, 7 Drawing Sheets

ENGINE CATALYST AGING SYSTEM AND METHOD FOR AGING CATALYST

FIELD OF INVENTION

The present invention relates to a system and method for the aging of catalytic converters for automobiles. In particular, the system and method allow a catalyst to be aged in combination with the engine for which it will be used.

BACKGROUND OF THE INVENTION

The performance of a catalytic converter in an automobile will degrade as a function of time which in turn affects the catalyst's effectiveness for preventing the emission of harmful gases. Therefore, it is important to measure the degradation of a catalyst's performance as it ages. Early failure of a catalyst leads to undesirable emission levels-released into the atmosphere. To gauge the aging performance, it has been the practice to field test catalysts by road testing an automobile having the catalyst installed. However, this method of testing is both costly and time consuming. In order to avoid the necessity of road testing, attempts have been made to alter the operation of the engine and artificially accelerate the aging process.

The purpose of modifying the engine operating conditions is to assure that, after exposure to the accelerated aging, the catalyst reacts to emission gases in a similar manner as the catalysts which have been actually aged on a vehicle.

U.S. Pat. No. 4,878,380 teaches altering the operation of an engine by the introduction of gases into the intake manifold of the engine for the purpose of testing the engine catalyst. This technique has been used only to handle testing. Thus, the effect on the engine control module is important. Although this technique may be sufficient for testing, it will not allow for proper aging to occur because of the ability of the engine control module to correct the air fuel ratios.

To accelerate the aging process, engines have been used as programmable gas generators. These engines have been programmed to generate various gas mixtures and other additives have been added to the exhaust to further age the catalyst. However, to control an engine when so used is difficult. Control has been established by removing or blocking the engine control module so that it cannot compensate for engine abnormalities. However, if the engine control module remains connected and cannot compensate, it becomes disabled or dysfunctional and will not perform the other function needed to maintain a stable operating condition.

One potential solution would be to remove the engine control module; however, without the module, it would make the operation of the engine difficult. Also, if the engine control module were to be removed, important information which it contains would be lost. This information can be used to help maintain better control of the engine while operating under conditions which will accelerate the aging of a catalyst.

Thus, there is a need to develop a method for aging catalyst that uses a standard engine without the need to remove or alter the engine control module.

OBJECTS OF THE INVENTION

It is an object of the invention to provide an engine catalyst aging system that will intermittently take control of the engine.

It is another object of the invention to provide a system that will allow the control to be passed back to the engine control module in an orderly and reproducible manner.

It is another object of the invention to provide an engine catalyst aging system that will keep the engine control module active when the control has been relinquished to the engine catalyst aging system.

It is yet another object to provide a programmable system that can control the engine so as to provide a controllable/programmable gas (emissions) generator.

It is still another object of the invention to provide an engine catalyst aging system which compensates for changes in environmental parameters as the test is being conducted so as to avoid drift of the test while in progress.

It is still another object of the invention to provide additives to the exhaust gas thereby enhancing the aging process.

It is still another object of the invention to provide a system that can be used to evaluate catalyst performance.

These and other objects of the invention will be apparent from the following description, drawings and claims.

SUMMARY OF INVENTION

The present invention provides a method for catalyst aging and a system for doing the same. Both the method and the system convert a conventional engine into a programmable gas generator for providing aging gases for a catalyst.

The system and the method are designed for use with conventional engines and do not require modification of the engine. This feature provides great flexibility to the system, allowing the engine to be paired with the catalyst it is used with in the field. This method of testing allows for realistic simulation of aging. Since catalysts are designed to be used with a particular engine, the engine for which it is designed will generate the volume of gases that the catalyst should process when the catalyst is in field service. Furthermore, the engine, when used to generate exhaust gases, will provide a distribution of by-products characteristic of the engine. The characteristics of an engine's exhaust gases vary depending on the strategy of the engine control module, the geometry of the engine, the amount of oil blow-by, and the type of fuel used.

The engine used for testing the catalyst is a standard engine employing production injectors and a production engine control module. The engine is provided with a conventional exhaust system which includes at least one exhaust gas oxygen sensor for providing exhaust gas oxygen signals to at least one exhaust gas signal input of the engine control module. The system will operate with a conventional wiring harness. The harness terminates at a first end in a harness connector which inserts into an engine control module connector. The harness has a second end which connects to the engine sensors and exhaust gas oxygen sensors.

The engine catalyst aging system of the present invention provides means for generating at least one set of operator defined injection pulse widths for providing an operator defined fuel supply to the engine.

The injector pulse widths can be generated from a set of values selected by the operator or by an algorithm or routine supplied by the operator. Either method can be processed by a central processing unit such as a microprocessor to provide the injection.

The engine catalyst aging system of the present invention provides means for switching the engine injection mode between the engine control module injection signals and at least one set of operator defined injection pulse widths.

Means for providing reference injection pulses from the engine control module are provided. At least one artificial injection load on which the injection signals from the engine control module can pull is employed as a means for providing said reference injection pulses.

Preferably, the means for switching the engine injection mode will have an injection relay for each injector. An injector flag generator is provided for each injector relay. The injector flag define the desired injection mode. A signal conditioner is provided for each injection relay which monitors output of the rising edge of the reference injection pulse and provides the information to a flip flop device which is triggered by the leading edge. The triggering of the flip flop in turn activates the injector relay driver logic which activates the injection relay.

Means for generating simulated exhaust gas oxygen signals are provided for each of the exhaust gas oxygen sensors. The simulated exhaust oxygen signals are provided to the engine control module when the operator defined injector pulse widths are being provided to the engine control module. These signals allow the engine control module to continue to function as if the exhaust gases were varying in about stoichiometric values and so that the engine control module can continue to provide the other functions which it must provide for the stable operation of the engine.

The signals can be supplied by an operator defined algorithm. The algorithm is a transform of reference injection pulse widths from the engine control module. The algorithm can be processed by a central processing unit such as a microprocessor to provide the simulated exhaust gas oxygen signal.

Means for switching the engine control module exhaust gas oxygen signal input between the exhaust gas oxygen signal and the simulated exhaust gas oxygen signals are provided; they provide a smooth and orderly transfer of the engine control module between using the simulated exhaust gas oxygen signals and the actual exhaust gas oxygen signals.

Preferably, the means for switching the exhaust gas oxygen signal for each exhaust gas sensor are provided with a gas sensor relay. Means for generating an exhaust gas flag which controls the gas sensor relay are provided to define the desired exhaust oxygen gas signal to each input of the engine control module. A sensor flag reader is provided for each gas sensor relay to define the desired state and to set an appropriate time delay for the response. A gas sensor relay driver is provided for each of the exhaust gas sensors.

Means are provided to selectively break the wires of the wiring harness and provide for interfacing the engine and its related peripherals with the engine catalyst aging system.

It is further preferred that when the engine is operating under control of the engine control module that the average pulse width of the injectors can be obtained. These can be stored so that the drift caused by environmental operation conditions, such as temperature and pressure, can be monitored.

In practicing the method of the present invention, the same engine and catalyst arrangement described above is employed. The method uses an engine in combination with a catalyst designed for use with the engine.

The engine is stabilized at a pre-defined engine speed and load. After the engine is stabilized, it is run under its engine control module for a time sufficient to establish a baseline operation, for which an average pulse width is calculated.

The injector control is transferred to an operator defined set of pulse widths. While the engine is operating under the operator defined pulse widths, a simulated exhaust gas oxygen signal is provided to the engine control module. The simulated signal is substantially equivalent to the exhaust gas oxygen signal when the engine is operating under the control of the engine control module.

Preferably, the transfer of the operation of the injectors to and from the operator determined pulse widths is done by first determining the condition of the injectors before transfer is allowed. Transfer of an injector is delayed until the injector has just closed.

Preferably, the method periodically returns the operation of the injectors to the control of the engine control modules to allow calculation of a new average pulse width. The new average pulse width is compared with the earlier average and the operator defined pulse widths are scaled proportionally with respect to the change in the average pulse width.

The above discussed method of operation is particularly well suited for implementation with a computer.

BEST MODE FOR CARRYING THE INVENTION INTO PRACTICE

Figure 1:
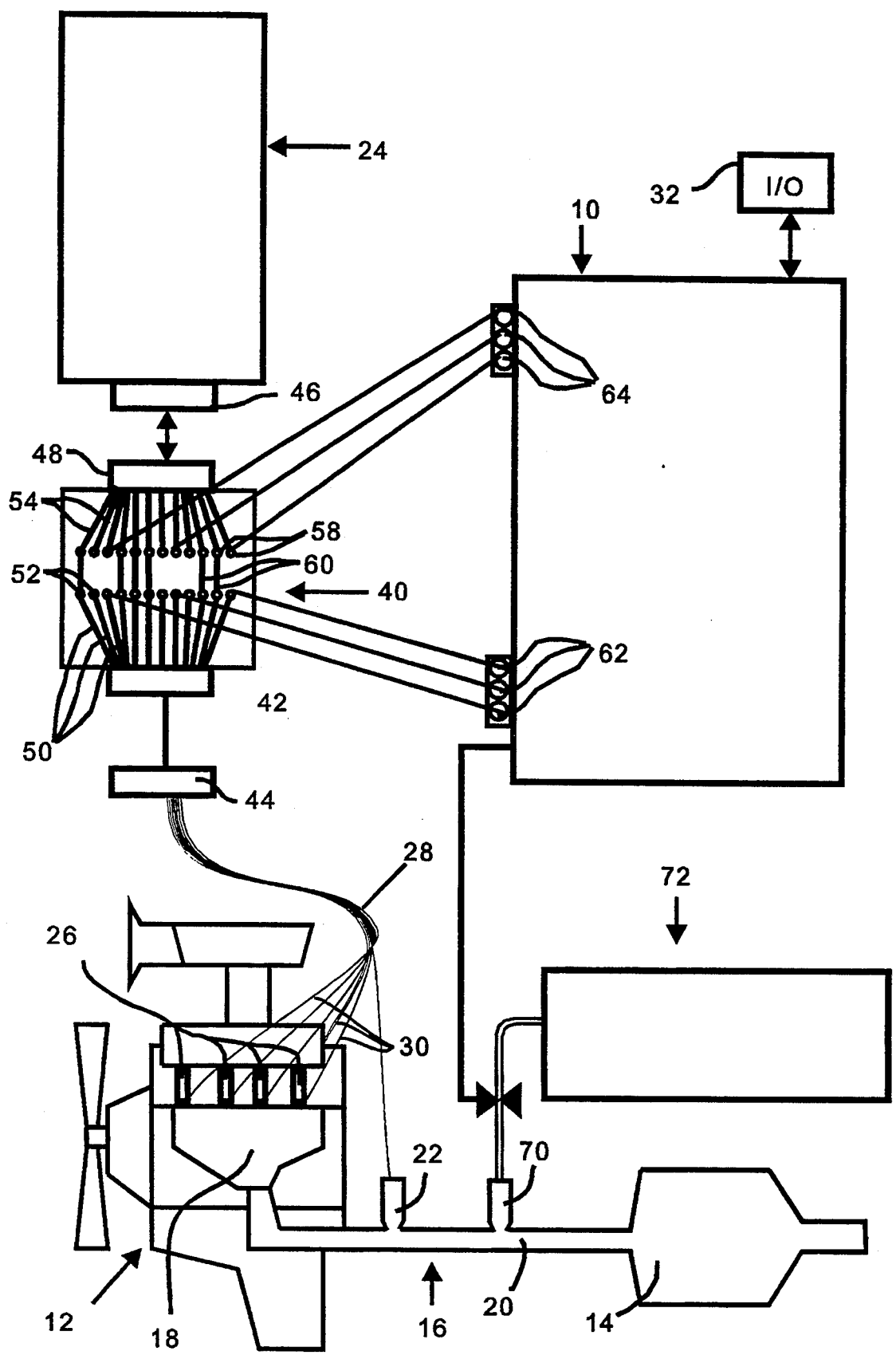
FIG. 1 schematically illustrates one embodiment of the present invention for an engine catalyst aging system. This embodiment includes an engine with standard associated peripherals. The peripherals include an exhaust gas oxygen sensor, a catalyst, the engine control module, and a wiring harness. The embodiment of FIG. 1 also includes a breakout box which breaks and redirects the signals passing through the wiring harness from the engine and associated peripherals. The embodiment of FIG. 1 also includes an exhaust port to allow injection of additives to the exhaust gas generated by the engine.

FIG. 1 illustrates an engine catalyst aging system 10 which is designed to be used in combination with an engine 12 and its associated catalyst 14. The engine 12 is chosen to be the engine for which the catalyst 14 is designed. By so pairing the engine 12 with the catalyst 14, a more representative aging of the catalyst 14 can be provided, since each engine 12 will have a characteristic exhaust output which will vary from one engine design to another. Trace elements produced by oil in the combustion chamber, as well as variations in engine control strategies can vary the composition of exhaust gases produced by an engine.

The engine 12 is connected to an exhaust system 16, having an exhaust manifold 18 and an exhaust pipe 20. The exhaust system 16 passes exhaust gases over the catalyst 14. An exhaust gas oxygen sensor 22 is disposed between the engine exhaust manifold 18 and the catalyst 14. An engine control module 24 is provided for regulating the operation of the engine 12. The engine control module 24 provides control of the opening of injectors 26 which regulate the injection of a fuel air mixture into the engine 12.

The exhaust gas oxygen sensor 22 monitors the exhaust gases, providing data on the composition of the gases passing through the exhaust system 16. This data is evaluated by the engine control module 24 which varies the pulse width for opening the injectors 26 responsive to this data. When the engine 12 is operating under the engine control module 24, the engine 12 is said to be operating in the closed-loop condition. The engine control module 24 also makes adjustments for barometric pressure and other environmental parameters such as temperature to maintain an air fuel supply which will provide for near stoichiometric combustion in the engine 12. The engine control module 24 is frequently programmed to provide an oscillating pulse width to the injectors 26 so as to provide a variable air/fuel ratio which oscillates around the stoichiometric level. Such oscillation has been found effective to increase the efficiency of the catalytic process as discussed further in U.S. Pat. No. 5,119,629.

The exhaust gas oxygen sensor 22 and the engine control module 24 are connected through a wiring harness 28. The wiring harness 28 contains a bundle of wires 30. The wires 30 connect various inputs/outputs of the engine control module 24 to particular components of the engine 12. Such components include the injectors 26 as well as engine peripherals including the exhaust gas oxygen sensor 22. The engine catalyst aging system 10 is provided to override some of the functions of the engine control module 24 such as varying the pulse width provided to the injectors 26 so that the amount of fuel injected can be altered to suit the operator's needs. The engine catalyst aging system 10 has an input/output interface 32 which allows an operator to input data and instruction for setting the pulse width for the injectors 26. This data overrides that which is generated by the engine control module 24. Transfer of control is accomplished by breaking selected wires from the wiring harness 28 which connects the engine 12 and the engine control module 24 and reconnects the broken wires through the engine catalyst aging system 10. Similarly, information being passed by the wires from the exhaust gas oxygen sensor 22 to the engine control module 24, is broken and redirected through the engine catalyst aging system 10. A breakout box 40 is preferably used to break the input selective wires in the wiring harness 28.

The engine catalyst aging system 10 generates a simulated exhaust gas oxygen signal to the engine control module 24 which indicates that the exhaust being sensed is continuing to fluctuate about a stoichiometric value. This simulated signal does not indicate to the engine control module 24 that the injection pulse width has been changed. Instead, the simulated signal provides an indication of the system fluctuating about a stoichiometric value.

This interruption of the wires 30 allows the engine catalyst aging system 10 to control functions communicated through the interrupted wires. The breakout box 40 has a first breakout box connector 42 which connects with a harness connector 44. The harness connector 44, in turn, is designed to interface with an engine control module connector 46. The breakout box 40 has a second breakout box connector 48 which is designed to interface with the engine control module connector 46 so that the breakout box 40 can be interposed between the wiring harness 28 and the engine control module 24.

The breakout box 40 has inlet leads 50 which connect to contacts embedded in the first breakout box connector 42. These inlet leads 50 terminate with inlet terminals 52.

Similarly, outlet leads 54 connect to contacts embedded in the second breakout box connector 48. These outlet leads 54 terminate with outlet terminals 58. When jumpers 60 are connected between the input terminals 52 and the outlet terminals 58, the signals will be passed directly from the wiring harness 28 to the engine control module 24. Alternatively, when the inlet terminals 52 are connected to inlet jacks 62 of the engine catalyst aging system 10 and the outlet terminal 56 are connected to outlet jacks 64 of the engine catalyst aging system 10, the signals will be interrupted by the engine catalyst aging system 10.

In order to accelerate the aging of the catalyst 14, the engine catalyst aging system 10 provides an operator defined injection pulse width which has been provided by the operator through the input/output interface 32 of the engine control module 24 to the injectors 26 of the engine 12. The injection pulse widths are selected to displace the average value of the exhaust gas from the stoichiometric value and provide the distribution of exhaust gases sought for aging the catalyst 14. When the injectors 26 are controlled by the engine catalyst aging system 10, the signal from the exhaust gas oxygen sensor 22 is blocked and not received by the engine control module 24. The engine catalyst aging system 10 provides a simulated signal which reflects the signal that would have existed if control of the injectors 26 had been left with the engine control module 24.

A catalyst under the control of the engine catalyst aging system 10 is an extended test (e.g. several days) and during this time, the environmental conditions under which the engine 12 will be operating will be subject to change. For example, atmospheric pressure, as well as the temperature and relative humidity under which the engine 12 is operating, may vary. When the engine 12 is operating in the closed-loop condition under the engine control module 24, the environmental variables are sensed and the engine control module 24 alters the pulse width of the injectors 26 to compensate for the variations. The mean pulse width of each cycle will reflect changes in environmental conditions.

When operating under the operator defined injection pulse widths generated by the engine catalyst aging system 10, no corrective measures for the pulse widths will be provided unless the pressure and other environmental factors are monitored by the engine catalyst aging system 10 and an algorithm is developed to provide for correction. This process is both costly and time consuming.

In order to provide the correct action without developing such algorithms, it is preferred to periodically return the control of the engine 12 to the engine control module 24 and operate the engine 12 under the closed-loop condition for a period of time sufficient to calculate a new average pulse width of the injectors 26. The new calculated average pulse width can be compared to the earlier pulse width and a correction provided for the environmental changes that have occurred. A suitable interpolation technique can be used to provide a scale of the pulse width that will be used by the injectors 26 when the system is returned to the engine catalyst aging system 10, to maintain a stable output. The time between returns to the engine control module 24 should be small when compared to the period over which significant change in the environmental variables occur.

In order to provide an orderly transfer of the injectors between the engine catalyst aging system 10 to the engine control module 24, it is necessary to keep the engine control module 24 actively operating so that it will be expecting to provide signals to the injectors 26 on demand. A simulated exhaust gas oxygen signal is generated by the engine catalyst aging system 10 and supplied to engine the control module 24 so that when control is transferred back to the engine control module 24, it will be conditioned to generate normal injection pulses. It is also necessary to keep the engine control module 24 actively operating to generate the additional signals that are needed to be provided to the engine 12 and not be generated by the engine catalyst aging system 10. Since the operation of the engine 12 is being controlled, at least in part at all times, by the engine control module 24, the signals from the engine control module 24 and the engine catalyst aging system 10 must be coordinated in order to avoid malfunction of the engine 12. If malfunction does occur with today's engine control modules, they will sense a malfunction and will turn the engine 12 into a "limp home mode" which could override the inputs from the engine catalyst aging system 10 by adjusting other parameters such as timing, thereby changing the operation of the engine to a point where there could be catastrophic damage to the catalyst being tested.

In order to be able to expose the catalyst 14 to a broader spectrum of gases, one or more exhaust ports 70 which inject additives from an additive reservoir 72 into the exhaust are provided. These additives may be controlled by a separate control system (not shown) or can be made integral with the engine catalyst aging system 10 as illustrated in FIG. 1.

To effectively switch between the engine catalyst aging system 10 and the engine control module 24, it is necessary that three functions be maintained. First, the engine control module 24 should remain active as discussed above; second, the switching should transfer control between the engine catalyst aging system 10 and the engine control module 24 when the injectors 26 are closed; third, the simulated exhaust gas oxygen signal should be continued after transfer of the injectors 26 is made for a time sufficient to purge the exhaust.

In order for the engine control module 24 to remain active, it will be necessary to provide a simulated exhaust gas oxygen signal for the exhaust gas oxygen sensor 22 while the injectors 26 are operated under the engine catalyst aging system 10. Such a simulated exhaust gas oxygen signal can be generated by providing a function with the same period as the fluctuation in the pulse widths of the injectors 26 while the engine 12 is operating in the closed-loop condition.

It will also be necessary to have a means for physically transferring control from one system to the other at a period of time when the injectors 26 are closed and can be readily transferred.

The time lapse for switching signals from the simulated exhaust gas oxygen signal to the actual exhaust gas oxygen signal should be sufficient to allow purging of the exhaust system 16. This will be a function of the type of vehicle which the engine 12 will use. This delay prevents the engine control module 24 from sensing residual levels of exhaust gases resulting from operating the injectors 26 under the control of the engine catalyst aging system 10.

Figure 2:
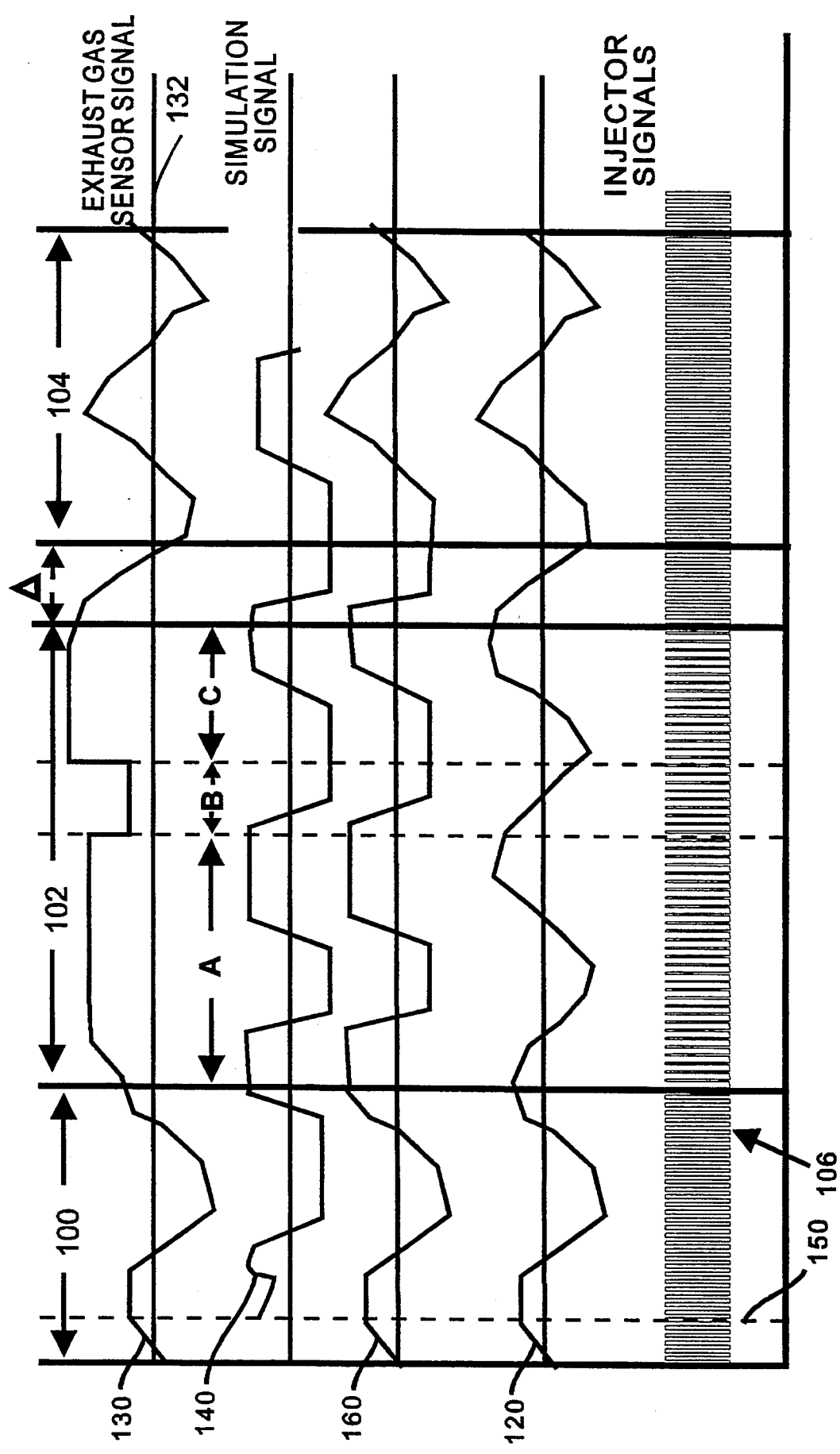
FIG. 2 illustrates the signals generated by the engine control module and the engine catalyst aging system as a function of time. The signals shown include a cycle under control of the engine control module, a cycle under control of the engine catalyst aging system, and a portion of a cycle under the control of the engine control module. A transition zone between the control of the engine catalyst aging system and the engine control module is also shown. The signals are shown for one of the injectors of the engine shown in FIG. 1 as well as the signal generated by an exhaust gas oxygen sensor and simulated exhaust gas oxygen signal generated by the engine catalyst aging system. The cycle under control of the engine catalyst aging system is shown with three zones, each having a different injection pulse width.

FIG. 2 provides a schematic representation of various signals provided to the injectors 26 from the engine control module 24 which meet the criteria set forth above. The horizontal axis in this figure is time and can be divided into four periods.

The first time interval 100 represents a period when the engine 12 is operating under the engine control module 24 and the engine 12 is operating in what has been earlier defined as the closed-loop condition. The second time interval 102 represents a time interval when the engine 12 is operating under the engine catalyst aging system 10. The third time interval $\Delta$ represents a period wherein transition is being made from the engine catalyst aging system 10 to full control by the engine control module 24. The fourth time interval 104 represents another period of time when the engine 12 is under control of the engine control module 24 (e.g. the engine is operating in the closed-loop condition).

Figure 3:
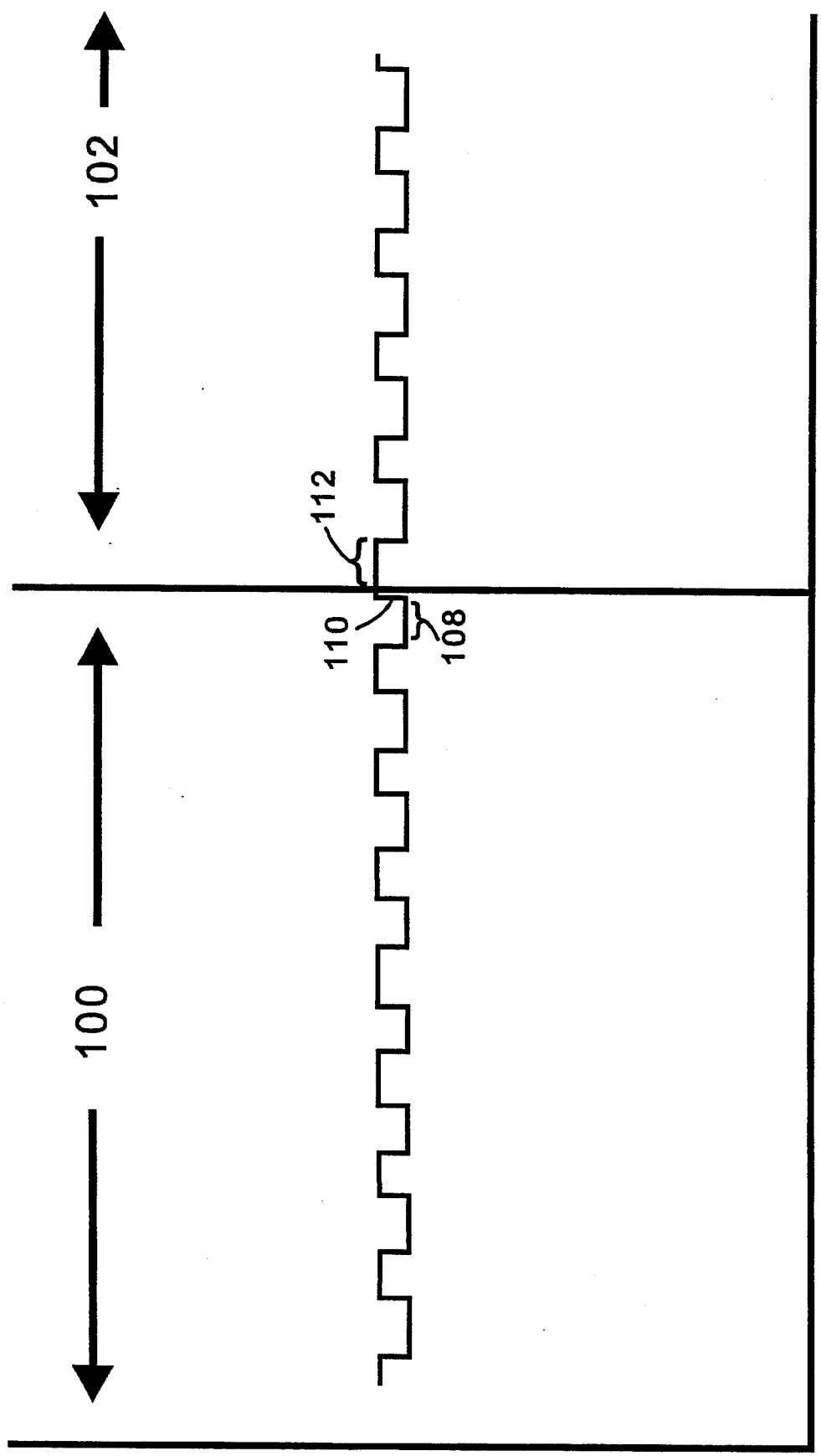
FIG. 3 illustrates, in greater detail, the variation in the pulse width for injectors which are generated by the engine control module and the phase relationship between the injector pulses that should be maintained when transferring between the engine control module and the engine catalyst aging system.

During the time interval represented by 100, injection signals 106 which are controlling the injectors 26 are being generated by the engine control module 24. The pulse width oscillates as is better shown in FIG. 3. When the time reaches the end of the period when the engine 12 operates under the engine control module 24, the closed-loop condition, a current injection drive pulse 108 must be checked and transfer is forestalled until an up-edge 110 of the pulse 108 has passed. This will provide a time interval 112 for the injectors 26 to adjust to the new signal pattern and allow the longest period of time in which the change over can occur. Similarly, when transfer is turned back to the engine control module 24, at the beginning of the period $\Delta$, again, the injection signals 106 from the engine control module 24 should be transferred back to the injectors 26 when the injectors 26 are closed. Having the transfer occur just after the injectors 26 close, avoids injection of an exhaust fuel mixture during the transfer of control which could cause a partial injection and allows the maximum time for the injectors 26 to settle to the new control system before the injectors 26 are triggered again.

In the second time interval when the injection signals 106 are controlled by the operator, shown in FIG. 2, the character of the pulse width of the injection signals 106 will be set by the operator of the engine catalyst aging system 10. As illustrated in FIG. 2, three cycles, A, B, and C, having a constant but different pulse width have been represented.

The curve 120 shows the exhaust gas oxygen signal as a function of time during the first time interval 100; and during the second time interval 102, the curve 120 shows the signal as it might have been if control had remained with the engine control module 24. The curve 130 illustrates a signal generated by the exhaust gas oxygen sensor 22 as a function of time. As can be seen during the first time interval 100 where the engine 12 is operating in the closed-loop condition, the signal 130 tracks the signal 120 which in turn coincides with the period of the pulse width variation for the injectors 26. However, when control of the injectors 26 is transferred to the engine catalyst aging system 10, the exhaust gases no longer track the variations in the pulse widths which will be generated by the engine control module 24 if control had not been surrendered to the engine catalyst aging system 10. The levels will now be responsive to pulse widths of the operator controlled cycles A, B, and C. Thus, the levels will not fluctuate about stoichiometric average 132. Without such fluctuation about the stoichiometric average 132, the engine control module 24 will respond by placing its operation into a default mode. The default mode can cause engine conditions to vary such as the spark angle which leads to a reduction of exhaust gas temperature. This reduction is not desirable since the temperature fluctuations cause variable aging to the catalyst 14. Furthermore, when control of the injectors 26 is given back to engine control module 24 which is in a default state, undesirable events such as excessive fuel injection followed by excessive oxygen concentration may occur. This leads to unpredictable and undesirable aging conditions.

Thus, for this portion of the engine operating cycle 102, it is necessary to generate a simulated exhaust gas oxygen signal, as is shown in the curve 140. In general, the generation of the initiation of the simulated exhaust gas oxygen signal 140 is started before the time control of the injectors 26 is given to the engine catalyst aging system 10. The signal 160 is the signal sensed by the engine control module 24.

The simulated curve 140 can be generated by a variety of transformation techniques converting the periodic fluctuation resulting from the variation in the pulse width while under control of the engine control module 24 and thereafter the pulse width resulting from the engine control module pulse width, generated from responding to an artificial injection load from the engine catalyst aging system.

Figure 4:
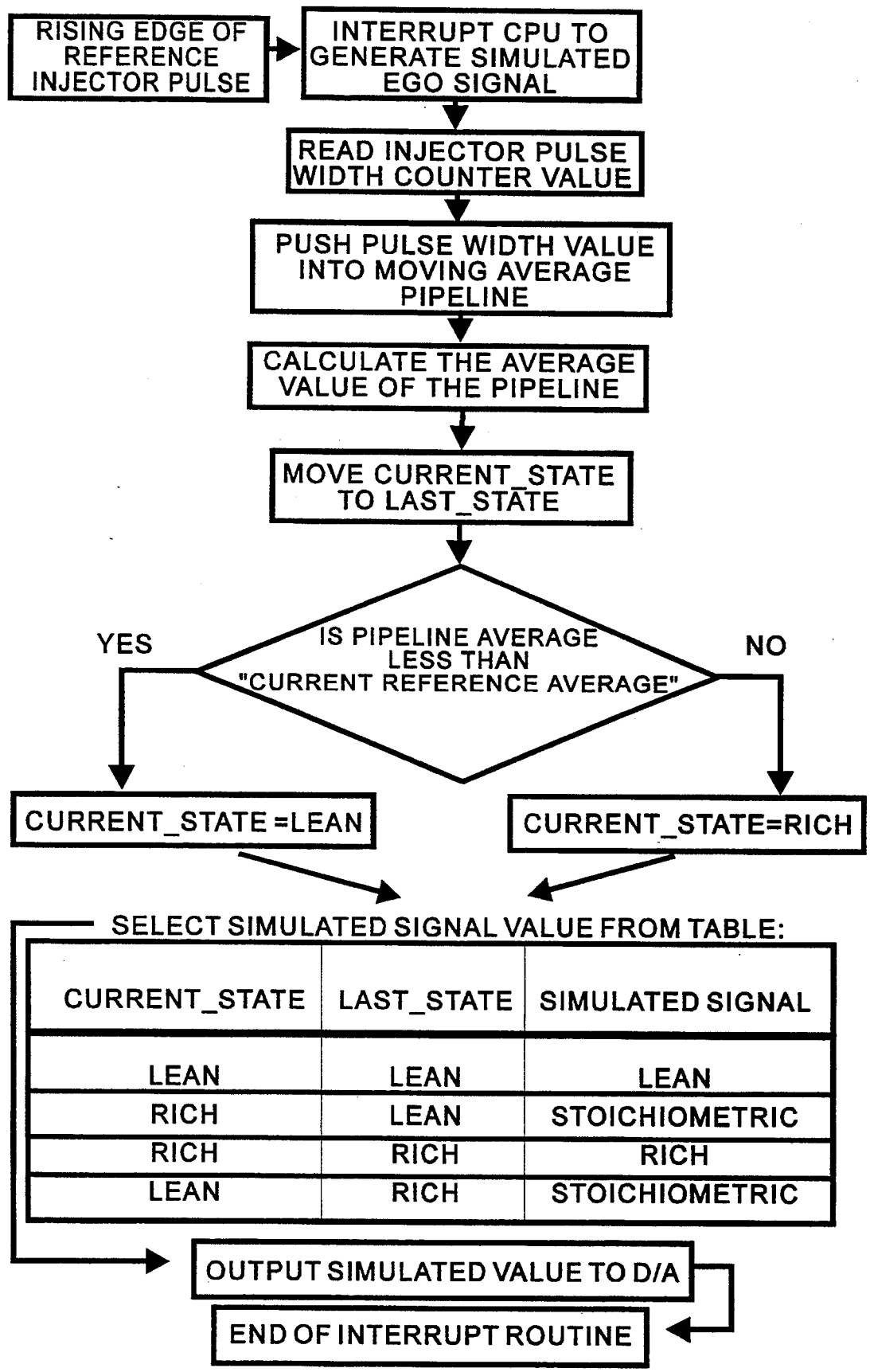
FIG. 4 is a flow diagram describing an algorithm for generating a simulated exhaust gas oxygen signal. The algorithm is based on a four point averaging technique which is used to determine a pseudo value of the signal. The values on which the averages are based are injector pulse widths that are provided by the engine control module. These are the pulses that would have been provided to the injectors if the engine were operating under closed-loop (normal) conditions. These pulses are generated by the engine control module as its pulsing signal pulls against an artificial load.

FIG. 4 is a depiction of one particular embodiment for providing the simulated gas oxygen signal. In this embodiment, an average value of the pulse width is calculated based upon the pulse width. The calculation is initiated at time 150 which is before the beginning of the second time interval 102 when control is under the engine catalyst aging system 10. Since the simulated signal must be ready at the time of the take-over, the generated simulated signal is shown in 140 and ignored until such time as control is taken over by the engine catalyst aging system 10.

This simulated signal will continue to be used throughout the second time interval 102 when under the control of the engine catalyst aging system 10, and will continued thereafter for a cycle $\Delta$, since the signals generated by the exhaust gas oxygen sensor 22 will still be controlled by the residual gas in the exhaust system. Period $\Delta$ of about $\frac{1}{4}$ to $\frac{1}{2}$ of a second will be more than sufficient to purge the exhaust system of the gases generated before control is returned to the engine control module 24. Thereafter, the simulation can be discontinued, since the injectors 26 are under control of the engine control module 24.

When the simulation technique and the engine catalyst aging system 10 are being operated by a CPU, FIG. 4 illustrates a method for implementing the averaging process. When the rising edge of the reference injection pulse, generated by the artificial load, is sensed, the rising edge causes an interrupt in the operation in the CPU causing it to execute a service routine. The first step of the service routine is to read the reference injector pulse width value from a pulse width counter through which the reference signal is passed. This value is stored in a pipeline defined as N consecutive values maintained in a first in first out fashion. Preferably, N is a small number between 2 and 6. The value of the numbers contained in the pipeline are then averaged.

In order to obtain meaningful values, there is an initial start-up time required during which dummy values must be created. The dummy values can be the residual in the pipeline left over from preceding operations. As discussed earlier, a lead time to start the calculation must be provided before such times as meaningful values are required. The average is then taken creating an average value of the pipeline register. Since the response of the engine control module 24 to the exhaust gas oxygen signal is based on recognition of the oscillation of the signal through the mean values the signal can be generated by treating the output as state values of LEAN and RICH. In order to determine if there will be a change required, there are two registers used for the state of the signal; one for the current state and one for the state of the preceding step. When the calculation is being performed for each interaction, the current state value is then moved to the last state value register and the average pipeline is compared with respect to the current referenced average which was generated earlier when the system was operating under the engine control module 24.

If this comparison yields a pipeline average less than the current referenced average, then the current state is set equal to lean, alternatively, the current state is set equal to rich.

Based on the past value of the current state and the last state, a simulated signal is digitally generated according to the logic table in FIG. 4. The digital signal can be converted to an analog signal using a D/A converter and for the example set forth will generate a wave form 140 with the period set forth in FIG. 2.

Figure 5:
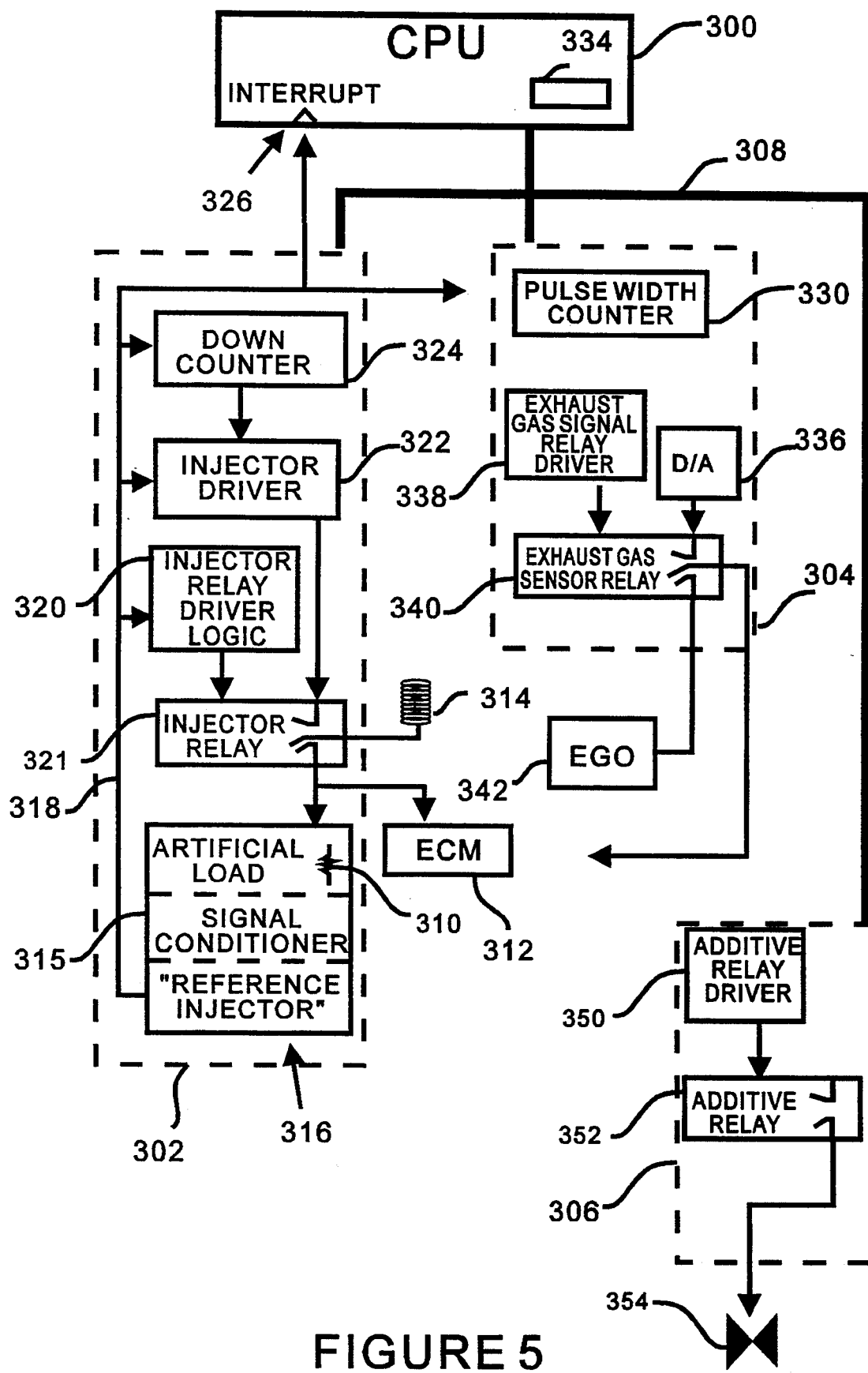
FIG. 5 is a schematic of one engine catalyst aging system which employs a central processing unit to implement the system of the present invention. The system has cards having dedicated circuity and processing capacity which complement the functions performed by the central processing unit; in the embodiment shown, a separate card is provided for each injector. The system also has cards having dedicated circuity and processing capacity which complement the functions performed by the central processing unit, the embodiment shown there is a separate card for overseeing each exhaust gas oxygen sensor.

FIG. 5 shows one embodiment of the present invention which has a CPU 300 that communicates with a series of injection cards one of which is illustrated as a first injector card 302 in FIG. 5. The cards for the remaining injectors are equivalent.

The CPU 300 also communicates with a series of exhaust gas oxygen simulator cards, one of which is illustrated as a first exhaust gas oxygen simulator card 304 in FIG. 5. The remaining cards for the exhaust gas oxygen simulations are equivalent.

The CPU 300 has an additive card 306 which is provided when there are exhaust ports provided in the exhaust system for the injection of additives to the exhaust gas. This card is controlled by the CPU 300 and is designed to control the addition of one or more additives to the exhaust gases.

The injector card 302, the exhaust gas oxygen simulator card 304 and the additive card 306 all communicate with a CPU via bus 308.

The injector card 302, in turn, has a resistor 310 connected to an injector driver of an engine control module 312. The resistor 310 serves as an artificial load on which the engine control module 312 can pull. The resistor 310 is connected in parallel with the injector 314 when the engine control module 312 is driving the injector 314. A resistor 310 being so connected and having a large resistive load when compared to the load generated by the injector 314 is preferred, since the resistor 310 will have little effect when operating in parallel with the injector 314. The signal passing through the resistor 310 when the injector 314 is not being driven by the engine control module 312 is processed by a signal conditioner 315 and provides a signal. The resistor 310 and the signal conditioner 315 provide a reference injector 316. The reference injector 316 provides a reference injector signal 318 which is supplied to the system as an input to various circuits. The circuits are; an injector relay driver logic 320, an injector driver 322, a down counter 324. Also supplied are a CPU interrupt input 326, and a pulse width counter 330 located on the exhaust gas oxygen simulator card 304.

The injector relay driver logic 320 is designed to switch the injector relay 321 so that the engine control module 312 or the engine catalyst aging system 10 control the injector 314. The injector relay driver logic 320, receives data from the CPU 300, via the bus 308. The data sets an injector flag within the injector relay driver logic 320, indicating the desired mode of the injector relay 321. The mode simply defines which entity, the engine control module 312 or the engine catalyst aging system, controls the engine injectors 314. However, the switching of the injector relay 321 is not performed immediately. Instead, the switching is synchronized with the reference injector signal 318 being timed with respect to a rising edge 110 illustrated in FIG. 3. By synchronizing to the rising edge 110, the injector 314 has completed its injection therefore, it is idle and can by switched. Furthermore, synchronizing to a rising edge 110 allows for the maximum time to completely switch the injector relay 321. This maximum time period is illustrated by 112 in FIG. 3. The rising edges 110 are sensed by standard flip flop gates in the circuitry of the injector relay driver logic 320.

A down counter 324, monitors the injector signal 318 to detect a falling edge of the reference injector pulse. This indicates the onset of injection and causes the down counter 324 to begin decreasing a value presented to it by the CPU 300, via the bus 308. This value represents the amount of time the injector 314 should allow fuel to be injected. When the down counter 324 decrements the value to zero, it sends a signal to the injector driver 322, causing it to deactivate the injector 314. The counter 324 then re-initiates its previous value to prepare for the next injection, or it receives a new value from the CPU 300.

The reference injector signal 318 is also an input to the injector driver 322. The injector driver 322 monitors the reference injector signal 318 and activates the injector 314 once the falling edge is detected. The injector 314 is de-activated by the down counter 324 as described above.

The reference injector signal 318, enters an interrupt input to the CPU 300. The CPU 300 begins executing an interrupt routine 334. The purpose of the interrupt routine 334 is to generate a simulated exhaust gas oxygen signal. To produce a simulated exhaust gas oxygen signal, the CPU interrupt routine 334 reads the value of the pulse width counter 330 located on the exhaust gas oxygen simulation card 304. This value is transmitted via the bus 308. This value is then transformed and processed by a operator defined interrupt routine 334. One example is discussed in the text associated in FIG. 4. The output of the interrupt routine 334 is provided to a D/A converter 336 on the exhaust gas oxygen simulator card 304. The output voltage of the D/A converter 336 is passed to the exhaust gas relay 338 and is selectively presented to the engine control module 312 as requested by the CPU 300. The CPU 300 selects whether the simulated or real exhaust gas oxygen signal is presented to the engine control module 312 by setting an exhaust gas flag within the exhaust gas relay driver 338. The exhaust gas relay driver 338 then switches the exhaust oxygen relay 340 immediately upon receiving a new exhaust gas flag state. The state represents the mode of the exhaust gas sensor input of the engine control module. The mode can be either a real exhaust gas oxygen sensor input, or a simulated exhaust gas oxygen input signal. Since the switching of the exhaust gas relay 340 is immediate, the CPU 300 delays release of the simulated exhaust gas oxygen signal when control is relinquished to the engine control module 312. A delay of ¼ of a second is more than sufficient to purge the gases produced while the engine control module 312 was not in control of the injector 314. If the purge does not occur, the possibility exists that the engine control module 312 may take undesired actions to correct what it perceives to be an engine problem.

In addition, FIG. 5 shows the additive injector card 306. This card 306 receives data from the CPU 300 via the bus 308. The CPU 300 sets an additive flag within the additive relay driver 350. This additive flag indicates the state of the additive relay 352 which controls a value 354 used to allow for additives to be introduced into the exhaust system 16 of FIG. 1 of the engine 12 of FIG. 1. The CPU 300 determines when and how long the additive is to be introduced by following a series of timed instructions presented to it by the operator.

The method of the present invention is well suited to implementation with a computer. When so doing, it is convenient to provide a two stage procedure. The first stage tests conditions under which the engine catalyst will be aged. It starts and stabilizes the engine, as well as establishes an operator defined cycle which will be employed to produce accelerated aging of the catalyst. The second stage runs the engine under the control of an engine catalyst aging system in combination with the engine's own engine control module.

Figure 6:
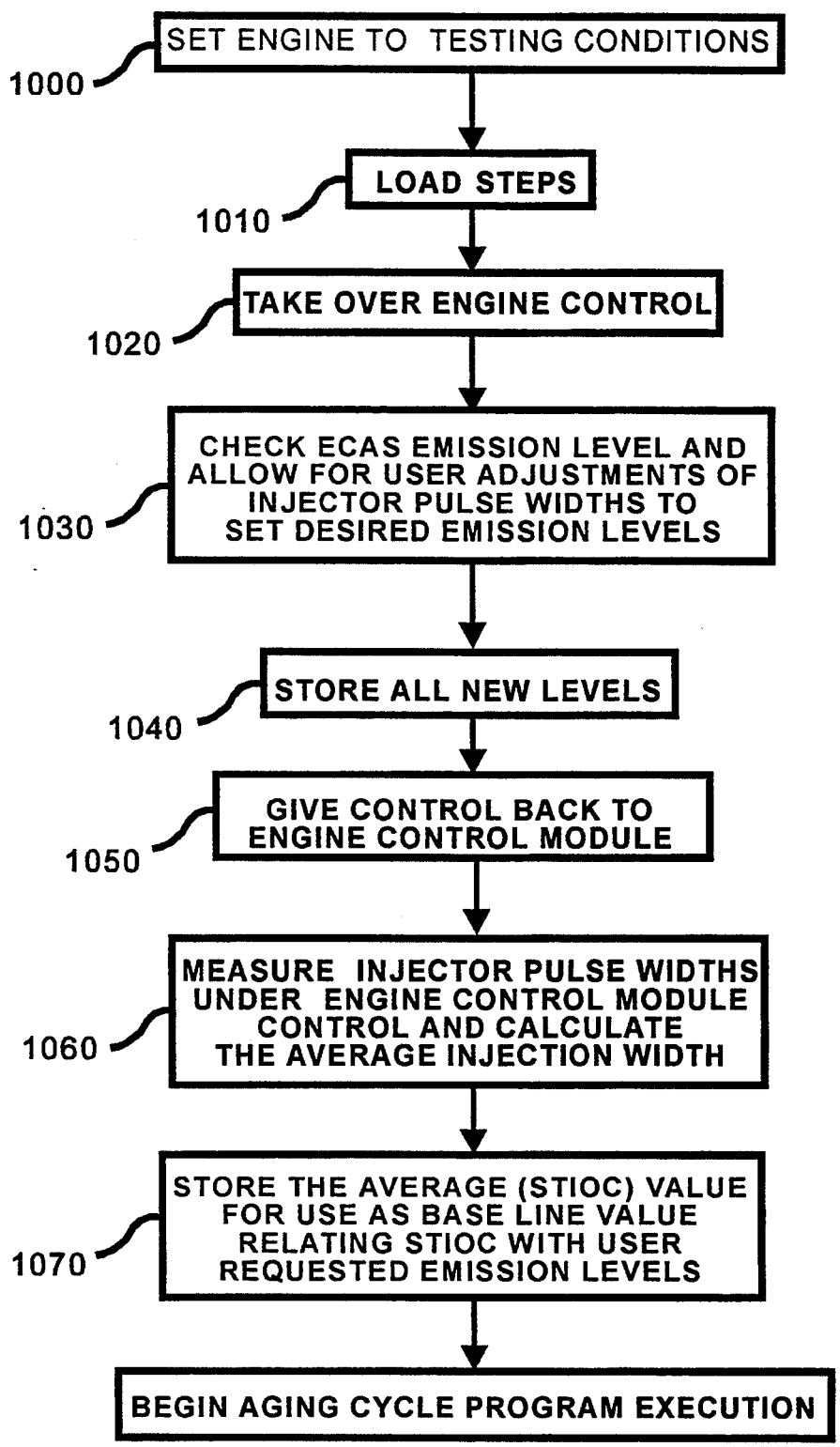
FIG. 6 is a flow diagram for the method of the present invention, illustrating the steps associated with initiating a computer for conducting the test, where the engine is stabilized under control of the engine control module.

FIG. 6 illustrates the steps for establishing conditions under which the test will be conducted. Step 1000 starts the engine and sets the speed and the load under which the test will be run.

In step 1010, the CPU is loaded by the operator with the commands under which the engine catalyst aging system will be run. This can be done through a conventional input device such as a keyboard or a disk drive. The commands will consist of a series of timed instructions establishing injector control, when additives are to be injected into the exhaust gas, and when the engine control module is to receive an exhaust gas oxygen signal or a simulated exhaust gas oxygen signal.

After steps 1000 and 1010 have been executed, step 1020 is initiated. During this step, the engine is controlled by the engine catalyst aging system. The operator then steps through each operator defined instruction and holds each instruction for a time sufficient to stabilize the response of the engine. Then the emission levels are checked in step 1030 using emission analyzers and calibration made by correcting the injector pulse width value for that particular instruction. The operator then moves on to the next instruction and repeats the procedure until all injector pulse width values are calibrated.

Step 1040 assigns these injector pulse width values as base reference injector pulses widths and stores them in memory registers of the CPU reserved for the base reference injector pulse widths.

Step 1050 runs the engine under control of the engine control module. While the engine is running under control of the engine control module, the average injector pulse width is calculated in step 1060. Step 1070 stores the average calculated (STOIC) width in the CPU memory.

Figure 7:
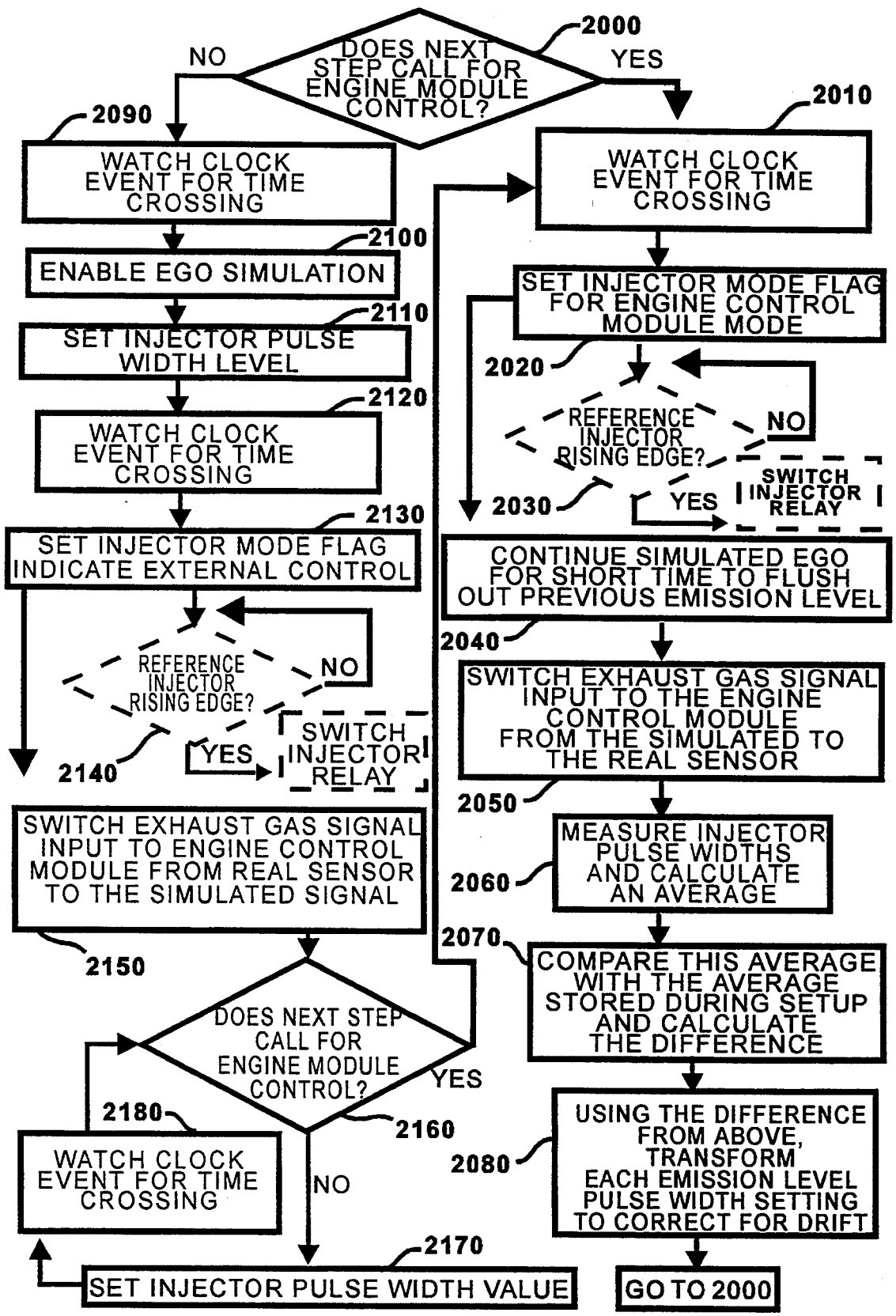
FIG. 7 is a flow diagram showing the aging steps for the method of the present invention when being implemented with a system having a central processing unit.

When the preparatory steps set forth in FIG. 6 have been completed, the engine control is turned over to the engine catalyst aging system and the catalyst is aged by the engine catalyst aging system as outlined in FIG. 7.

The operator commands, loaded into the CPU in step 1010, are sequentially presented to an engine control routine in step 2000 which checks to establish whether the next step calls for the engine control module. If it does, then the series of steps on the right side of FIG. 7 will be executed. In step 2010, the CPU of the engine catalyst aging system waits for the current timed instruction to complete. An injector flag is set in step 2020, indicating that the engine control module mode is requested. This injector flag is global of all injectors, but each of the injectors must maintain its current mode until the injector relay logic detects the condition of 2030 has been satisfied. As the condition is satisfied for an injector, the injector relay is switched.

In step 2040 the CPU waits while the engine control module continues to receive the simulated exhaust gas oxygen signal before it is switched to the actual signal generated by the exhaust gas oxygen sensor. The CPU wait is sufficient to flush out previous emission levels resulting from running under the engine catalyst aging system.

Step 2050 switches the signal received by the engine control module from the simulated exhaust gas oxygen signal to the actual exhaust gas oxygen signal.

Step 2060 calculates the average pulse width while the injectors are under the control of the engine control module. This value will determine if the environmental conditions have varied. Step 2070 compares the value calculated in step 2060 with the (STIOC) value saved in step 1070 and the difference is calculated.

Step 2080 provides corrected values for the pulse widths. These corrected values are obtained by scaling the base reference pulse widths by the difference and makes a correction by using the difference calculated in step 2070 and transforms the initial values saved in step 1040 as the base reference pulses.

When step 2080 is completed, step 2000 is repeated. If the next command does not call for the engine control module, the CPU waits a predetermined amount of time before the end of the current timed instruction at step 2090.

Step 2100 begins the simulation of the exhaust gas oxygen signal by enabling the simulation routine.

Step 2110 assigns the injector pulse widths equal to the values saved in step 2080.

In step 2120 the CPU waits for the current timed instruction to complete.

Step 2130 sets an injector mode flag indicating engine catalyst aging system control is requested. The injector flag is global of all injectors, but each of the injectors must maintain its current mode until the injector relay logic detects that the condition of 2140 has been satisfied. As the condition is satisfied for an injector, the corresponding injector relay is switched.

Step 2150 switches the signal received by the engine control module from the actual exhaust gas oxygen signal to the simulated exhaust gas oxygen signal.

Step 2160 checks the next command for the engine catalyst aging system and, if the command calls for the engine control module, it transfers to step 2010. If not, it proceeds to step 2170. In step 2170, new injector pulse widths are to be set to the appropriate values saved in step 2080.

At Step 2180, the CPU waits for the current timed instruction to complete. After completion of step 2180, the process is returned to step 2160.

While the invention has been described in terms of preferred embodiments, special configurations, and particular methods, it should be appreciated of one skilled in the art that variation in the methods and the equipment can be made by one skilled in the art without departing from the spirit of the invention.

What I claim is:

1. An engine catalyst aging system which uses an engine as a programmable gas generator for aging a catalyst, the engine being fitted with standard engine injectors, an engine control module, an exhaust system, at least one exhaust gas oxygen sensor for providing exhaust gas oxygen signals to at least one exhaust gas signal input of the engine control module, and a wiring harness having multiple wires which terminate in a harness connector which inserts into an engine control module connector, the harness connecting the engine control module to the engine so as to include all related sensors such as the injectors and the exhaust gas oxygen sensor, the system comprising:

means for generating at least one set of operator defined injector pulse widths for providing an operator defined fuel supply to the engine;

means for switching the engine injection mode between the engine control module injector signals and said engine catalyst aging system;

means for providing reference injector pulses from the engine control module;

means for generating at least one set of simulated exhaust gas oxygen signals for the engine control module;

means for switching at least one exhaust gas signal input of the engine control module between the at least one set of exhaust gas oxygen signals and said at least one set of simulated exhaust gas oxygen signals; and means for selectively breaking the wires of the harness providing an system/engine interface.

2. The engine catalyst aging system of claim 1 wherein said means for switching the engine injection mode further comprising:

at least one injection relay;

an injector flag for each of said at least one injector relay providing an injector relay state to define a desired injection mode;

a signal conditioner for each of said at least one injector relay which outputs the rising edge of said reference injector pulse;

a flip flop device for each at least one injector relay triggered by said rising edge; and an injector relay driver logic triggered by said flip flop, said driver logic activating said at least one injector relay.

3. The engine catalyst aging system of claim 2 wherein said means for switching the at least one gas sensor further comprises:

an at least one gas sensor relay; and an at least one exhaust gas flag providing a gas sensor relay state to define the desired exhaust oxygen sensor signal;

at least one gas relay driver triggered by said exhaust gas flag.

4. The engine catalyst aging system of claim 3 further comprising:

a CPU;

a CPU clock for providing a CPU time reference;

an input device for said CPU, said input device reads operator selected time based instructions, said time based instructions allow CPU to said injector flag state and said gas flag state.

5. The engine catalyst aging system of claim 4 wherein said means for providing at least one reference injector pulse further comprises:

an artificial injector load circuit being in parallel with the engine control module, said artificial injector load circuit generating a conditioned reference pulse; and at least a pulse width counter for measuring at least one conditioned reference pulse width.

6. The engine catalyst aging system of claim 5 wherein said artificial injector load circuit has a resistor to provide the load.

7. The engine catalyst aging system of claim 6 wherein said means for generating at least one set of operator defined injector pulse widths for providing an operator defined fuel supply to the engine further comprises:

a falling edge sensitive injection driver which turns on said injector when said falling edge of said conditional reference pulse is detected; and operator defined algorithm for setting pulse width.

8. The engine catalyst aging system of claim 7 further comprising:

means for storing said conditioned reference pulse widths in said CPU; and means for transforming selected stored pulse widths.

9. The engine catalyst aging system of claim 8 further comprising:

an exhaust port positioned in said exhaust;

a valve for opening and closing said port; and an emission additive supply.

10. The engine catalyst aging system of claim 9 further comprising a valve driver communicating with said CPU.

11. A method for aging a catalyst which uses an engine as a programmable gas generator for aging the catalyst, the engine being fitted with standard engine injectors, an engine control module, an exhaust system, at least one exhaust gas oxygen sensor for providing exhaust gas oxygen signals to at least one exhaust gas signal input of the engine control module, and a wiring harness having multiple wires which terminate in a harness connector which inserts into an engine control module connector, the harness connecting the engine control module to the engine so as to include all related sensors such as the injectors and the exhaust gas oxygen sensor, the method comprising:

stabilizing the engine to determine a predetermined load and speed;

running the engine under its engine control module for a time sufficient to establish a base line operation;

calculating a base average pulse width for the base line operation;

transferring the operation of the injectors of the engine from the engine control module to operator defined pulse widths; and providing a simulated exhaust gas oxygen signal to the engine control module to substitute for the exhaust gas oxygen signal while operating under said operator provided signals.

12. The method of claim 11 wherein said step of transferring the operation of the injector further comprising the steps of:

monitoring to observe the closing of the injectors; and delaying said transfer of the operation of the injectors until each of the injectors is observed closing.

13. The method of 12 further comprising the steps of:

periodically returning the operation of the injectors to the engine control module for a timed interval;

calculating a new pulse width average for said timed interval;

comparing said new pulse average with said base width average and scaling said operator defined pulse width with respect to the difference in said base average pulse width and said current pulse width.

* * * * *